United States Patent
Lazarowitz

(10) Patent No.: US 9,245,122 B1
(45) Date of Patent: *Jan. 26, 2016

(54) ANTI-MALWARE SUPPORT FOR FIRMWARE

(71) Applicant: American Megatrends, Inc., Norcross, GA (US)

(72) Inventor: Matthew Lazarowitz, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/505,351

(22) Filed: Oct. 2, 2014

Related U.S. Application Data

(63) Continuation of application No. 12/579,734, filed on Oct. 15, 2009, now Pat. No. 8,869,282.

(51) Int. Cl.
  *G06F 11/00* (2006.01)
  *G06F 21/56* (2013.01)

(52) U.S. Cl.
  CPC ...................................... *G06F 21/56* (2013.01)

(58) Field of Classification Search
  CPC .............. H04L 63/1416; H04L 63/145; H04L 63/1441; H04L 63/1408; H04L 63/14; G06F 21/56; G06F 21/566
  See application file for complete search history.

(56) References Cited

U.S. PATENT DOCUMENTS

| | | | |
|---|---|---|---|
| 7,266,843 B2 | 9/2007 | Tarbotton et al. | |
| 7,325,185 B1 | 1/2008 | Szor | |
| 7,827,611 B2 | 11/2010 | Kouznetsov et al. | |
| 7,853,999 B2 | 12/2010 | Khilnani et al. | |
| 7,877,801 B2 | 1/2011 | Repasi et al. | |
| 7,971,258 B1* | 6/2011 | Liao et al. | 726/24 |
| 8,381,298 B2 | 2/2013 | Blumfield et al. | |
| 2004/0025036 A1 | 2/2004 | Balard et al. | |
| 2005/0176415 A1 | 8/2005 | Jang et al. | |
| 2007/0277241 A1 | 11/2007 | Repasi et al. | |
| 2010/0017477 A1 | 1/2010 | Phan et al. | |
| 2011/0047618 A1* | 2/2011 | Evans et al. | 726/23 |
| 2011/0179484 A1 | 7/2011 | Tuvell et al. | |
| 2013/0205395 A1 | 8/2013 | Zimmer et al. | |

OTHER PUBLICATIONS

U.S. Official Action dated Nov. 23, 2011 in U.S. Appl. No. 12/579,734, filed Oct. 15, 2009, Inventor: Matthew Lazarowitz.

(Continued)

*Primary Examiner* — Fikremariam A Yalew
(74) *Attorney, Agent, or Firm* — Lee & Hayes, PLLC

(57) ABSTRACT

Technologies are described herein for anti-malware support within firmware. Through the utilization of the technologies and concepts presented herein, malicious software protection may be extended down to the firmware level. Detecting malicious firmware or software, removing it from firmware, and actively preventing it from exploiting known security vulnerabilities may be supported. Application level anti-malware software may interface with, and be supported by, one or more firmware level anti-malware modules. Firmware level anti-malware modules can actively prevent malicious software from affecting the system firmware. For example, the anti-malware modules may monitor or block access to the firmware. Anti-malware modules may be available at both boot-time and run-time. Thus, a wider range of malicious software attacks or infiltrations may be mitigated.

20 Claims, 7 Drawing Sheets

(56) References Cited

OTHER PUBLICATIONS

U.S. Official Action dated Apr. 10, 2012 in U.S. Appl. No. 12/579,734, filed Oct. 15, 2009, Inventor: Matthew Lazarowitz.
U.S. Official Action dated Jul. 31, 2012 in U.S. Appl. No. 12/579,734, filed Oct. 15, 2009, Inventor: Matthew Lazarowitz.
U.S. Official Action dated Dec. 27, 2012 in U.S. Appl. No. 12/579,734, filed Oct. 15, 2009, Inventor: Matthew Lazarowitz.
U.S. Official Action dated Apr. 24, 2013 in U.S. Appl. No. 12/579,734, filed Oct. 15, 2009, Inventor: Matthew Lazarowitz.
U.S. Official Action dated Nov. 18, 2013 in U.S. Appl. No. 12/579,734, filed Oct. 15, 2009, Inventor: Matthew Lazarowitz.
U.S. Notice of Allowance/Allowability dated Jun. 5, 2014 in U.S. Appl. No. 12/579,734, filed Oct. 15, 2009, Inventor: Matthew Lazarowitz.

\* cited by examiner

ANTI-MALWARE SUPPORT FOR FIRMWARE

CROSS-REFERENCE TO RELATED APPLICATIONS

This application is a continuation of U.S. patent application Ser. No. 12/579,734, now U.S. Pat. No. 8,869,282, entitled "ANTI-MALWARE SUPPORT FOR FIRMWARE," which was filed on Oct. 15, 2009, and which is incorporated herein by reference in its entirety.

BACKGROUND

Malware, or malicious software, can infect or infiltrate a computer system. Some examples of malware may include computer viruses, worms, trojan horses, spyware, adware, root kits, and so forth. Malware may also include any undesirable code or software that diminishes performance, consumes resources, circumvents security, or otherwise impacts the operation of a computer system. Detection and removal of such malware may be attempted to protect computers from damage, security breaches, or unauthorized use or access.

In many computing systems, low-level instruction code, or firmware, is used as an intermediary between the hardware components of the computing system and high-level software executing on the computing system such as an operating system. In some computer systems, this low-level instruction code is known as the Basic Input and Output System (BIOS). The BIOS provides a set of software routines that allow high-level software to interact with the hardware components of the computing system using standard calls.

Firmware within a computing system or embedded system may be extensible, updatable, or otherwise susceptible to alteration. Thus, malware may infect or modify the firmware in undesirable ways.

It is with respect to these considerations and others that the disclosure made herein is presented.

SUMMARY

Technologies are described herein for anti-malware support within firmware. Through the utilization of the technologies and concepts presented herein, malicious software protection may be extended down to the firmware level. Given the extensible nature of the Unified Extensible Firmware Interface (UEFI), vulnerabilities exploited by malicious software to perform undesired actions on the level of the operating system (OS) may become possible at the firmware level. Detecting such software, removing it from the computer system firmware, and actively preventing it from exploiting known security vulnerabilities may be supported.

According to one aspect presented herein, application level anti-malware software may interface with, and be supported by, one or more firmware level anti-malware modules. The anti-malware software may support malicious software detection. The anti-malware software may support removal of the malicious software.

According to another aspect presented herein, firmware level anti-malware modules can provide a service to actively prevent malicious software from affecting the system firmware. For example, the anti-malware modules may monitor or block access to the firmware.

According to yet another aspect presented herein, anti-malware modules may be available at both boot-time and run-time. Thus, a wider range of malicious software attacks or infiltrations may be mitigated.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
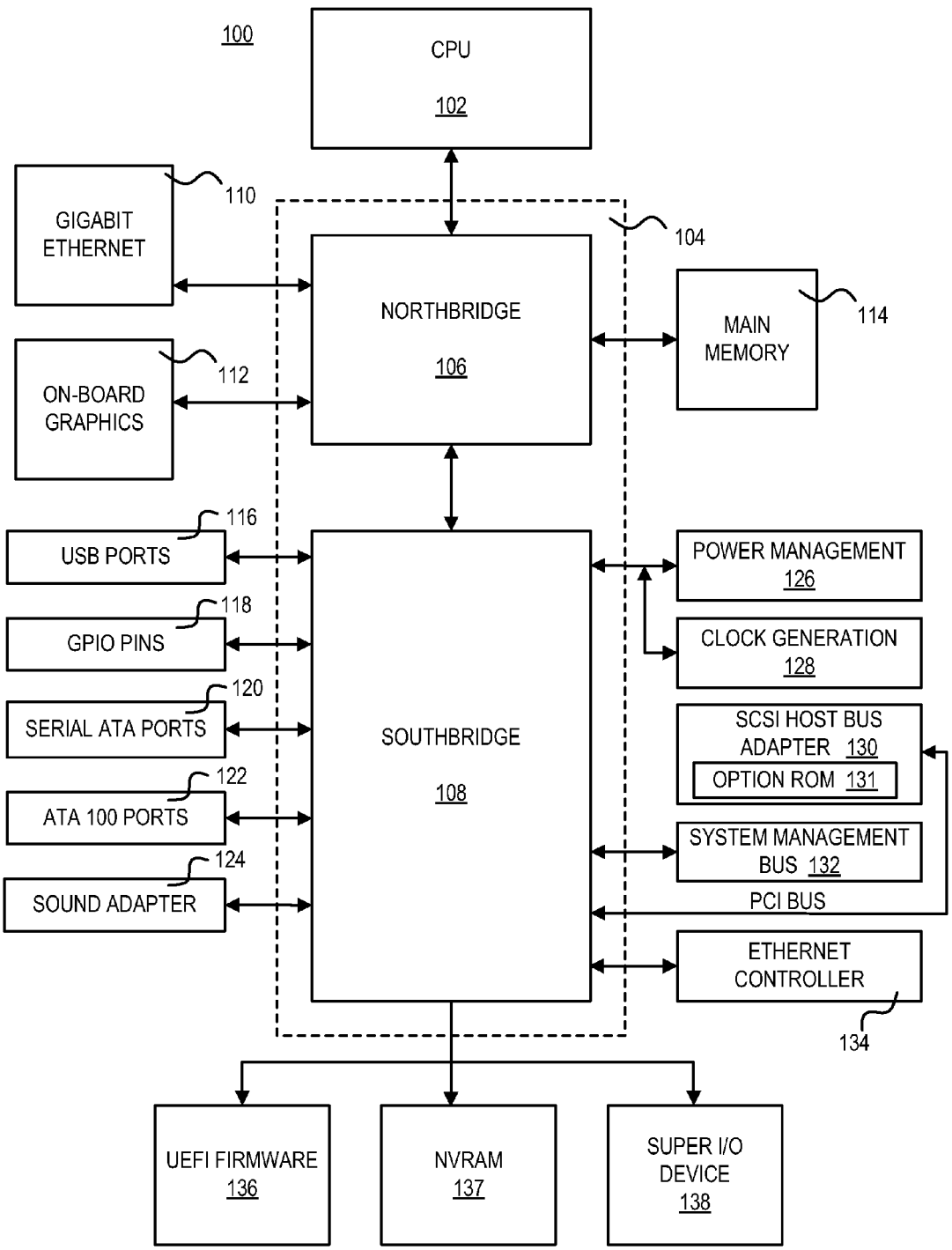
FIG. 1 is a computer architecture diagram that illustrates various components of a computer that provides an illustrative operating environment for the implementations presented herein.

Embodiments of the disclosure presented herein provide methods, systems, apparatuses, and computer-readable media for anti-malware support within firmware. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

FIG. 1 and the following discussion are intended to provide a brief, general description of a suitable computing environment in which embodiments presented herein may be implemented. While the embodiments presented herein are described in the general context of program modules that execute in conjunction with the execution of a computer firmware, those skilled in the art will recognize that various embodiments may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like. Embodiments presented herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to provide and utilize a firmware capable of supporting anti-malware functionality within firmware. The firmware comprising the anti-malware functionality may be a computer BIOS, extensible BIOS, extensible firmware, EFI/UEFI firmware, custom firmware, semicustom firmware, or any other type of firmware or embedded computer or microcontroller code.

In order to provide the functionality described herein, the computer 100 can include a baseboard, or motherboard. The motherboard can be a printed circuit board to which a multitude of components or devices may be connected by way of a system bus or other electrical communication path. In one illustrative embodiment, a central processing unit (CPU) 102 can operate in conjunction with a chipset 104. The CPU 102 may be a standard central processor that performs arithmetic and logical operations necessary for the operation of the computer.

The chipset 104 includes a northbridge 106 and a southbridge 108. The northbridge 106 provides an interface between the CPU 102 and the remainder of the computer 100. The northbridge 106 also provides an interface to a random access memory (RAM) used as the main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to another computer via a network. Connections that may be made by the network adapter 110 may include local area network (LAN) or wide area network (WAN) connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computer 100. In particular, the southbridge 108 may provide one or more universal serial bus (USB) ports 116, a sound adapter 124, an Ethernet controller 134, and one or more general purpose input/output (GPIO) pins 118. The southbridge 108 may also provide a bus for interfacing peripheral card devices such as a BIOS boot system-compliant SCSI host bus adapter 130. In one embodiment, the bus comprises a peripheral component interconnect (PCI) bus. The southbridge 108 may also provide a system management bus 132 for use in managing the various components of the computer 100. Power management circuitry 126 and clock generation circuitry 128 may also be utilized during the operation of the southbridge 108.

The southbridge 108 is also operative to provide one or more interfaces for connecting mass storage devices to the computer 100. For instance, according to an embodiment, the southbridge 108 includes a serial advanced technology attachment (SATA) adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the southbridge 108 and the SCSI host bus adapter 130, and their associated computer-storage media, provide non-volatile storage for the computer 100. Although the description of computer-storage media contained herein refers to a mass storage device, such as a hard disk or CD-ROM drive, it should be appreciated by those skilled in the art that computer-storage media can be any available media that can be accessed by the computer 100. Computer storage media may include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory (NVRAM) for storing the firmware 136 that includes program code containing the basic routines that help to start up the computer 100 and to transfer information between elements within the computer 100. The UEFI firmware 136 comprises a firmware that is compatible with the UEFI Specification. The LPC interface may also be utilized to connect a NVRAM 137 to the computer 100. The NVRAM 137 may be utilized by the firmware 136 to store configuration data for the computer 100. The configuration data for the computer 100 may also be stored on the same NVRAM 137 as the firmware 136.

The computer 100 may be implemented as a conventional computer system, an embedded control computer, a laptop, or a server computer, a mobile device, a set-top box, a kiosk, a vehicular information system, a mobile telephone, a customized machine, or other hardware platform. The CPU 102 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The firmware 136 may comprise program modules for supporting anti-malware functionality. Storage media and the storage drives associated with the computer 100 may comprise additional program modules for supporting the anti-malware functionality. The program modules may include software instructions that, when loaded into the CPU 102 and executed, transform a general-purpose computing system into a special-purpose computing system customized to facilitate all, or part of, the anti-malware techniques disclosed herein. As detailed throughout this description, the program modules may provide various tools or techniques by which the computer 100 may participate within the overall systems or operating environments using the components, logic flows, and/or data structures discussed herein.

The CPU 102 may be constructed from any number of transistors or other circuit elements, which may individually or collectively assume any number of states. More specifically, the CPU 102 may operate as a state machine or finite-state machine. Such a machine may be transformed to a second machine, or specific machine by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to support anti-malware functionality. The states of either machine may also be transformed by receiving input from one or more user input devices, network interfaces 110, 134, other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 114, 136, 137 when the software or firmware is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
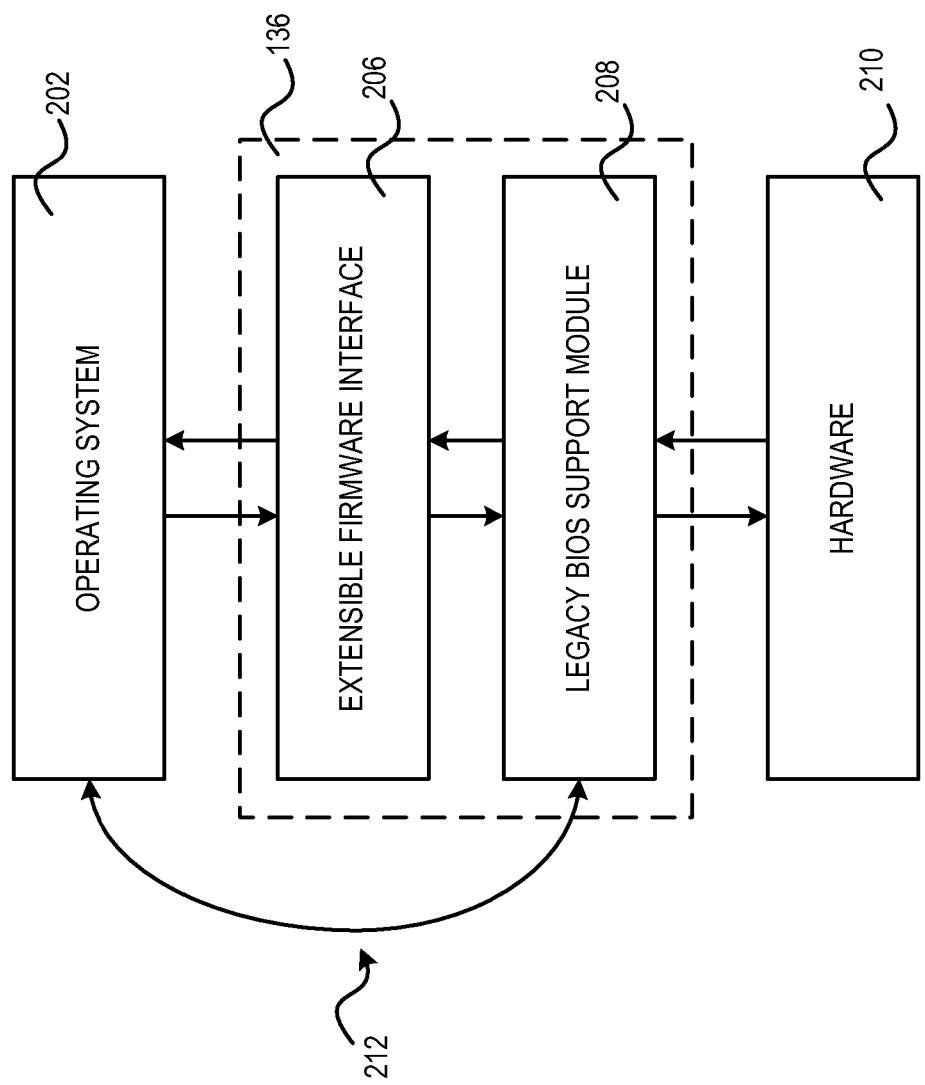
FIG. 2 is a block diagram illustrating aspects of an interface between a UEFI firmware and an operating system according to one or more embodiments presented herein.

Referring now to FIG. 2, a block diagram illustrates aspects of an interface between a UEFI firmware 136 and an operating system 202 according to one or more embodiments presented herein. As described with respect to FIG. 1, the firmware 136 may comprise a firmware compatible with the UEFI Specification from INTEL CORPORATION or from the UEFI FORUM. The UEFI Specification describes an interface between the operating system 202 and the system firmware 136. The UEFI Specification defines an interface that platform firmware may implement, and an interface that the operating system 202 may use while booting. How the firmware 136 implements the interface may be left up to the manufacturer of the firmware. The Specification can define a way for the operating system 202 and firmware 136 to communicate information necessary to support the operating system boot process.

According to some embodiments, both the UEFI 206 and a legacy BIOS support module 208 may be present in the firmware 136. This allows the computer 100 to support a UEFI firmware interface and a legacy BIOS firmware interface. In order to provide this functionality, an interface 212 may be provided for use by legacy operating systems and applications. According to other embodiments, only one of the UEFI 206 and the legacy BIOS support module 208 may be present in the firmware 136. According to yet other embodiments, the firmware 136 may interface with the hardware 210 through any of various other architecture, components, or modules for the firmware without specific involvement of the UEFI 206 or the legacy BIOS support module 208.

Anti-malware support may be provided within the UEFI 206, the legacy BIOS support module 208, any other BIOS module, any other firmware module, or any combination thereof. Additional details regarding the operation and architecture of UEFI can be found in the UEFI Specification and in the specifications that make up the Framework, both of which are available from INTEL CORPORATION and are expressly incorporated herein by reference.

Figure 3:
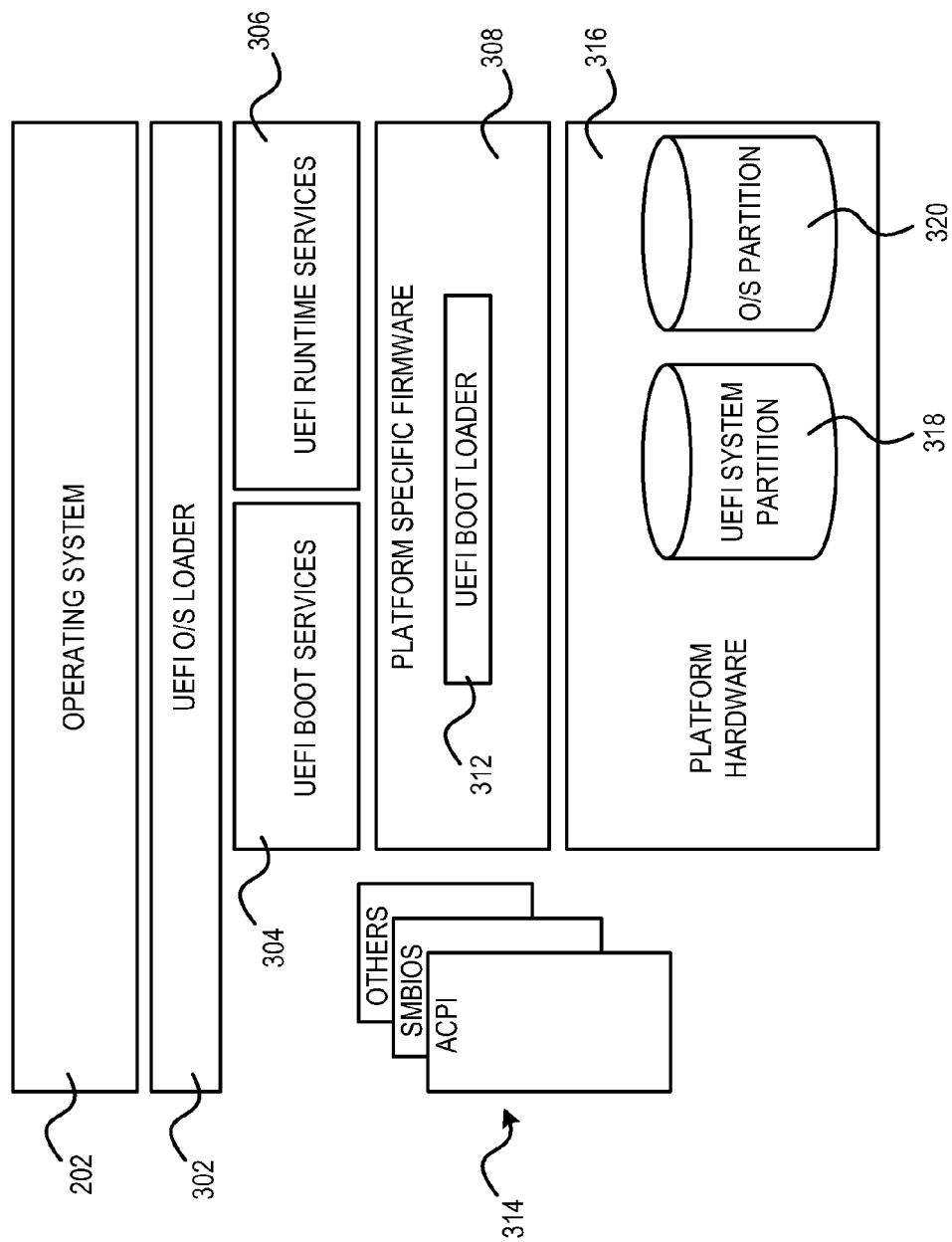
FIG. 3 is a block diagram illustrating a UEFI specification-compliant system providing an operating environment for one or more embodiments presented herein.

Turning now to FIG. 3, a block diagram illustrates a UEFI specification-compliant system providing an operating environment for one or more embodiments presented herein. The system can include platform hardware 316 and an operating system 202. The platform firmware 308 may retrieve an operating system (OS) image from the UEFI system partition 318 using an UEFI operating system loader 302. The UEFI system partition 318 may be an architecturally shareable system partition. As such, the UEFI system partition 318 can define a partition and file system designed to support safe sharing of mass storage between multiple vendors. An OS partition 320 may also be utilized.

Once started, the UEFI OS loader 302 may continue to boot the complete operating system 202. In doing so, the UEFI OS loader 302 may use UEFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface (ACPI) and the System Management BIOS (SMBIOS) specifications may be supported.

UEFI boot services 304 may provide interfaces for devices and system functionality used during boot time. UEFI runtime services 306 may also be available to the OS loader 302 during the boot phase. For example, a set of runtime services may be presented to ensure appropriate abstraction of base platform hardware resources used by the operating system 202 during its operation. UEFI allows extension of platform firmware by loading UEFI driver and UEFI application images which, when loaded, have access to UEFI-defined runtime and boot services. For example, runtime and boot services may be provided for supporting anti-malware functionality.

Various program modules can provide the boot-time and run-time services. These program modules may be loaded by the UEFI boot loader 312 at system boot time. The UEFI boot loader 312 is a component in the UEFI firmware that determines which program modules should be explicitly loaded and when. Once the UEFI firmware is initialized, it passes control to the boot loader 312. The boot loader 312 may then determine which of the program modules to load and in what order.

Figure 4:
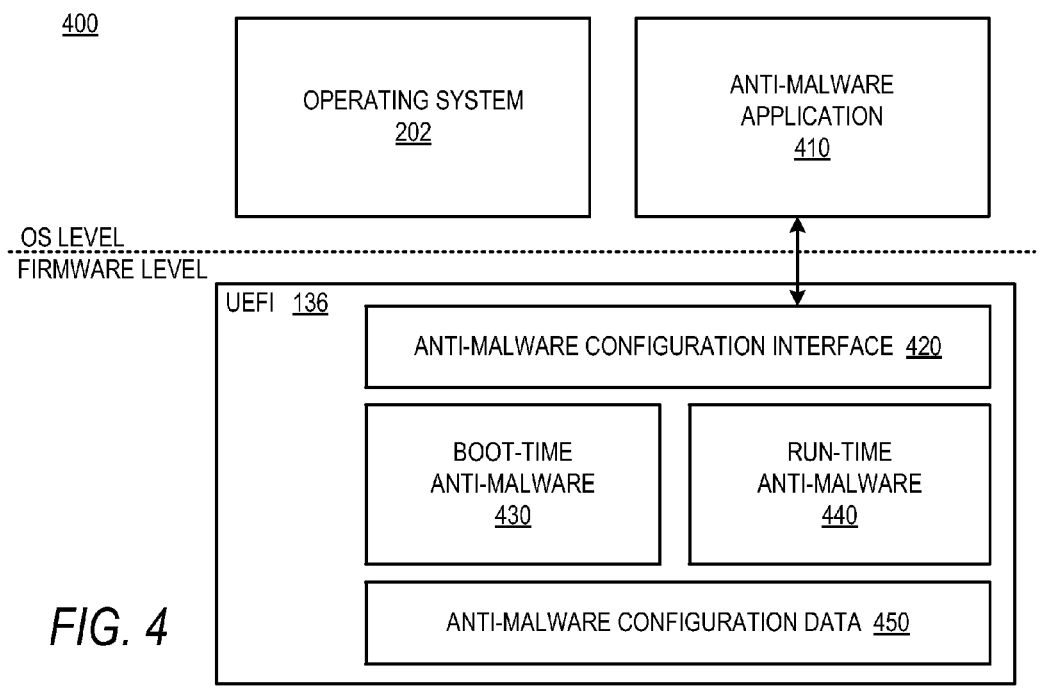
FIG. 4 is a block diagram illustrating operating system level and firmware level modules for supporting firmware anti-malware according to embodiments presented herein.

Referring now to FIG. 4, a block diagram 400 illustrates operating system level and firmware level modules for supporting anti-malware functionality within firmware according to one or more embodiments presented herein. The UEFI firmware 136 can support an anti-malware configuration interface 420. The anti-malware configuration interface 420 may be used to load and configure a boot time anti-malware module 430. The anti-malware configuration interface 420 may also be used to load and configure a runtime anti-malware module 440. The boot time anti-malware module 430 and the runtime anti-malware module 440 may be stored in, or in conjunction with, the UEFI firmware 136.

Anti-malware configuration data 450 may include configuration information related to the boot time anti-malware module 430 or the runtime anti-malware module 440. The configuration information within the anti-malware configuration data 450 may be entered through the anti-malware configuration interface 420. The anti-malware configuration data 450 may be stored in, or in conjunction with, the UEFI firmware 136. The anti-malware configuration data 450 may be stored in a nonvolatile memory such as a flash memory, a battery-backed complementary metal-oxide semiconductor (CMOS) memory, an NVRAM 137, other nonvolatile memory or storage, or any combination thereof. The configuration information may provide information regarding anti-malware operations. For example, when and how frequently malware scans are performed as well as what storage devices or memory areas the scans operate over may be specified. The configuration information may also include updatable signatures for detecting malware as well as indications of how to remove or isolate the malware elements once detected.

An operating system level may support the execution of the operating system 202. An anti-malware application 410 may also execute at the operating system level. The anti-malware application 410 may interface with the UEFI firmware 136. The interface between the anti-malware application 410 and the UEFI firmware 136 may be through the anti-malware configuration interface 420. Thus, the anti-malware application 410 may load, configure, execute, and otherwise interact with the boot time anti-malware module 430, the runtime anti-malware module 440, and the anti-malware configuration data 450. While one anti-malware application 410 is illustrated, a computing system, such as the computer 100, may operate with one, two, or any number of anti-malware applications 410.

Through the anti-malware configuration interface 420, or otherwise, an interface may be provided for reporting results to a user. The results may be associated with scans and protection agents. The interface may support user interaction as an auxiliary interface to UEFI protocols and services.

A backup set of UEFI drivers and services may be provided. These backup services and associated interfaces may provide support for scanning system firmware and removing detected malware. The associated interfaces may remain operational even when standard system interfaces have been compromised.

Firmware services may assist anti-malware applications 410 with malicious software detection. This functionality may include, but is not limited to, virus detection and root kit detection. Firmware support for anti-malware functionality may be operating system agnostic. As such, a single computing system with a single firmware may operate with various operating systems.

Malware scanning and monitoring within a firmware may interoperate or share resources such as signatures for detecting malware elements. Scanning may be used for searching out existing malware within memory devices or storage devices associated with the computer system. Monitoring may be used to detect intrusion or invasion of malware as it occurs. Monitoring may occur in real-time, in near real-time, or offline according to various embodiments.

Figure 5:
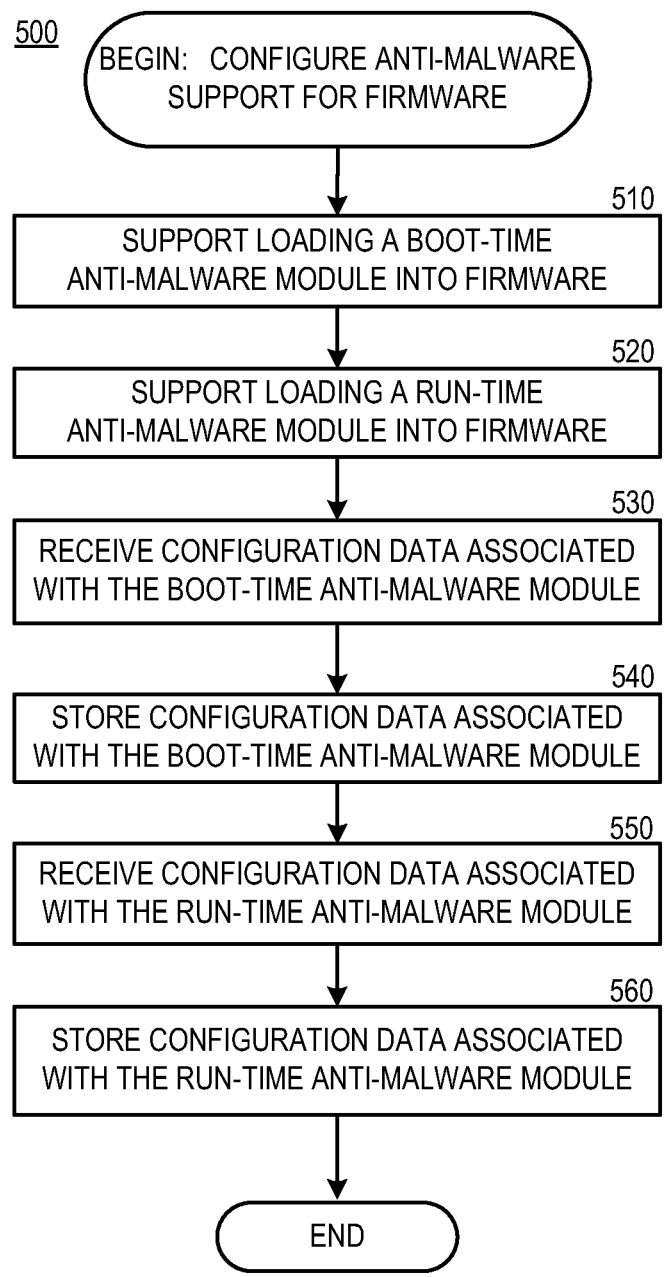
FIG. 5 is a logical flow diagram illustrating a process for configuring anti-malware support for firmware according to embodiments presented herein.

Turning now to FIG. 5, additional details will be provided regarding the embodiments presented herein for firmware support of anti-malware functionality. In particular, FIG. 5 is a flow diagram showing a routine 500 that illustrates aspects of a process for configuring anti-malware support for firmware according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 can begin with operation 510, where loading the boot time anti-malware module 430 into firmware 136 may be supported. The boot time anti-malware module 430 may be stored in, or in conjunction with, the UEFI firmware 136. The boot time anti-malware module 430 may be executed on a computing system at boot time. The boot time anti-malware module 430 may be loaded through a UEFI interface. The boot time anti-malware module 430 may be loaded through an anti-malware configuration interface 420. The boot time anti-malware module 430 may be loaded in conjunction with an anti-malware application 410. The boot time anti-malware module 430 may be provided within the UEFI firmware 136 delivered with a computing system or loaded during a firmware update process.

At operation 520, the runtime anti-malware module 440 may be loaded into firmware 136. This can be done the same way. The runtime anti-malware module 440 may be stored in, or in conjunction with, the UEFI firmware 136. The runtime anti-malware module 440 may be executed on a computing system during normal operational modes following boot time. The runtime anti-malware module 440 may be loaded through a UEFI interface. The runtime anti-malware module 440 may be loaded through an anti-malware configuration interface 420. The runtime anti-malware module 440 may be loaded in conjunction with an anti-malware application 410. The runtime anti-malware module 440 may be provided within the UEFI firmware 136 delivered with a computing system or loaded during a firmware update process.

At operation 530, configuration data associated with the boot time anti-malware module 430 may be received for configuration of the boot time anti-malware module 430. The configuration data associated with the boot time anti-malware module 430 may be received through the anti-malware configuration interface 420. The configuration data associated with the boot time anti-malware module 430 may be provided by, or in conjunction with, the anti-malware application 410.

At operation 540, the configuration data associated with the boot time anti-malware module 430 as received in operation 530 may be stored in, or in association with, the UEFI firmware 136. The configuration data associated with the boot time anti-malware module 430 may be stored in the anti-malware configuration data 450.

At operation 550, configuration data associated with the runtime anti-malware module 440 may be received for configuration of the runtime anti-malware module 440. The configuration data associated with the runtime anti-malware module 440 may be received through the anti-malware configuration interface 420. The configuration data associated with the runtime anti-malware module 440 may be provided by, or in conjunction with, the anti-malware application 410.

At operation 560, the configuration data associated with the runtime anti-malware module 440 as received in operation 550 may be stored in, or in association with, the UEFI firmware 136. The configuration data associated with the runtime anti-malware module 440 may be stored in the anti-malware configuration data 450.

Figure 6:
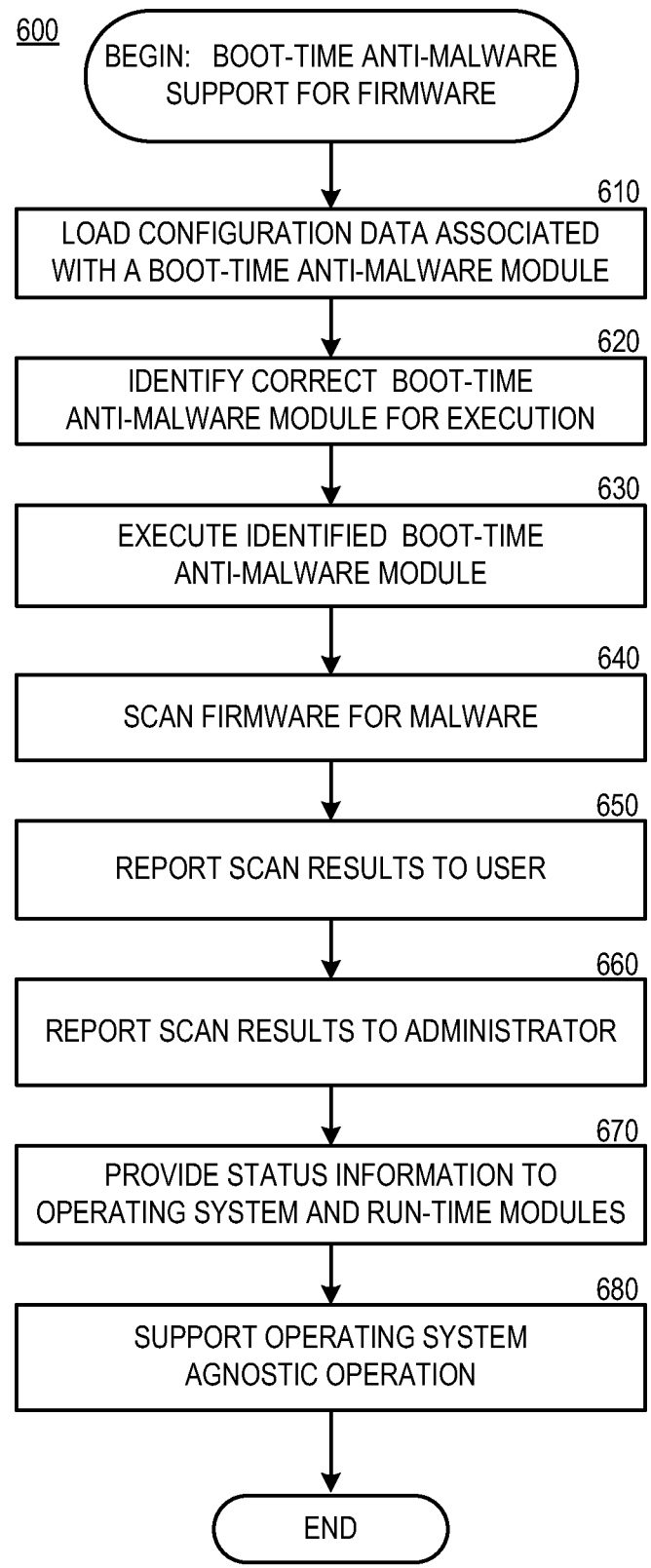
FIG. 6 is a logical flow diagram illustrating a process for boot-time anti-malware support within firmware according to embodiments presented herein.

Turning now to FIG. 6, additional details will be provided regarding the embodiments presented herein for firmware support of anti-malware functionality. In particular, FIG. 6 is a flow diagram showing a routine 600 that illustrates aspects of a process for boot time anti-malware support within firmware according to embodiments presented herein.

The routine 600 can begin with operation 610, where configuration data associated with the boot time anti-malware module 430 may be loaded. The configuration data associated with the boot time anti-malware module 430 may be loaded from the anti-malware configuration data 450.

At operation 620, a boot time anti-malware module 430 may be identified for execution. When multiple, or alternative, boot time anti-malware modules 430 are available in, or in conjunction with, the UEFI firmware 136, the anti-malware configuration data 450 may indicate the location of, or other identification information associated with, the current or desired boot time anti-malware module 430. Identifying the correct boot time anti-malware module 430 may also include verifying a signature or data integrity measure associated with the boot time anti-malware module 430. For example, data integrity may be tested using a checksum value, cyclic redundancy check CRC), or a hash value.

At operation 630, the boot time anti-malware module 430 identified in operation 620 may be executed. The execution of the boot time anti-malware module 430 may occur as part of the boot procedure of the computing system according to booting modules within the UEFI firmware 136. At operation 640, the UEFI firmware 136 may be scanned for malware. Procedures or routines for scanning the UEFI firmware 136 for malware may operate within the boot time anti-malware module 430. The scanning may include the entire UEFI firmware 136, portions thereof, or other areas of memory or storage devices associated with the computer 100.

At operation 650, results of the firmware scan performed at operation 640 may be reported to the user of the computing system. For example, the results may be displayed on a display device as part of a splash screen or firmware boot up information display.

At operation 660, the results of the firmware scan performed at operation 640 may be reported to an administrator of the computing system. Reports to the administrator may occur through system or network management software or various system management interfaces.

At operation 670, status information may be provided to the operating system or runtime modules associated with the computing system. The status information may include results of the firmware scan performed at operation 640. The status information may include various other configuration or status data associated with the anti-malware modules operating in conjunction with the UEFI firmware 136. The status provided to runtime modules may be provided to runtime anti-malware modules 440 associated with the UEFI firmware 136 and also to the anti-malware application 410.

At operation 680, the boot time anti-malware module 430, and interfaces thereto, including the anti-malware configuration interface 420, may support operating system agnostic operations. For example, functions within the boot time anti-malware module 430 and interfaces provided by the anti-malware configuration interface 420 may be accessed through, or in conjunction with, various different operating systems, such as operating system 202.

Figure 7:
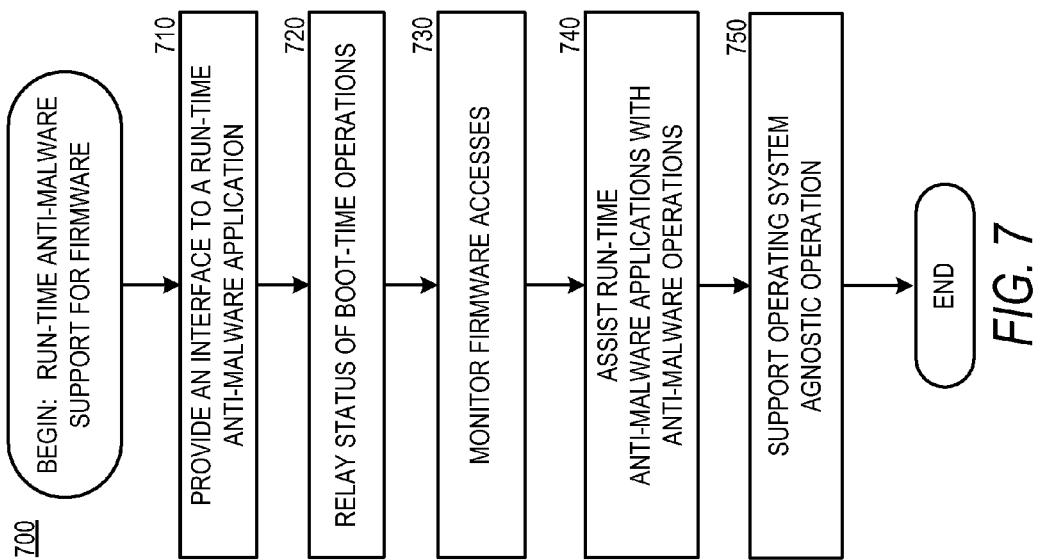
FIG. 7 is a logical flow diagram illustrating a process for runtime anti-malware support within firmware according to embodiments presented herein.

Turning now to FIG. 7, additional details will be provided regarding the embodiments presented herein for firmware support of anti-malware functionality. In particular, FIG. 7 is a flow diagram showing a routine 700 that illustrates aspects of a process for runtime anti-malware support within firmware according to embodiments presented herein.

The routine 700 can begin with operation 710, where an interface to runtime anti-malware module 440 may be provided. The anti-malware configuration interface 420 may provide all, or part of, the interface to the runtime anti-malware module 440. Through the provided interface, operating system level code such as that associated with the anti-malware application 410 may interface with the runtime anti-malware module 440.

At operation 720, the status of boot time operations may be relayed to the runtime anti-malware module 440 or to the anti-malware application 410. The status of boot time operations may include the results of boot time malware scans and various other malware operations supported at boot time through the boot time anti-malware module 430.

At operation 730, firmware access may be monitored. During runtime, accesses to firmware may be monitored to guard against the malicious replacement of the boot time anti-malware module 430, the runtime anti-malware module 440, or any other firmware modules. The malicious or unintended alteration of malware configuration data 450 through anti-malware configuration interface 420 may also be monitored. The monitoring of firmware accesses at runtime may be continuous. The monitoring of firmware accesses at runtime may be supported through the runtime anti-malware module 440 or other modules within, or associated with, the UEFI firmware 136.

At operation 740, operations of the anti-malware application 410 may be assisted by the runtime anti-malware module 440. Firmware functionality provided within the runtime anti-malware module 440 may support the anti-malware application 410 in performing anti-malware operations such as monitoring, scanning, updating, quarantine, isolation, and removal of malicious code or various other malware components within the computing system.

At operation 750, the runtime anti-malware module 440 and interfaces thereto, including the anti-malware configuration interface 420, may support operating system agnostic operations. For example, functions within the runtime anti-malware module 440 and interfaces provided by the anti-malware configuration interface 420 may be accessed through, or in conjunction with, various different operating systems, such as operating system 202.

Based on the foregoing, it should be appreciated that technologies for firmware support of anti-malware functionality are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for supporting anti-malware operations within a firmware of a computer, the computer-implemented method comprising:
providing an interface between a firmware level anti-malware module and an anti-malware application executing at an operating system level, the anti-malware module stored within the firmware;
receiving a request at the anti-malware module to perform monitoring of firmware accesses during a normal operational mode following a boot-time; and
performing the monitoring of the firmware accesses by the anti-malware module in response to receiving the request.

2. The method of claim 1, wherein the anti-malware module is further configured to expose a configuration interface for reporting results to a user.

3. The method of claim 1, wherein the anti-malware application is configured to load and configure the run-time anti-malware module through the interface.

4. The method of claim 1, wherein the anti-malware module comprises a run-time module for performing the monitoring of the firmware accesses.

5. The method of claim 1, wherein the anti-malware module is configured to block unauthorized modifications to the firmware.

6. The computer-implemented method of claim 1, wherein performing the monitoring of the firmware accesses by the anti-malware module comprises monitoring the firmware accesses for malware.

7. The computer-implemented method of claim 1, wherein the anti-malware application is configured to load and configure a boot-time anti-malware module through the interface, the boot-time anti-malware module configured to perform a malware scan by scanning the firmware for malware.

8. A computing system comprising:
a processing unit; and
a non-volatile memory device storing a firmware comprising an anti-malware module for execution at a firmware level on the processing unit, the anti-malware module configured to provide an interface between the anti-malware module and an anti-malware application executing at the operating system level and the firmware configured to perform anti-malware operations comprising performing monitoring of firmware accesses by the anti-malware module during a normal operational mode following a boot-time.

9. The computing system of claim 8, wherein the anti-malware module is further configured to block unauthorized modifications to the firmware.

10. The computing system of claim 8, wherein monitoring the firmware accesses during the normal operational mode following a boot-time further comprises monitoring the firmware accesses for malware.

11. The computing system of claim 8, wherein performing monitoring of firmware access is done in response to receiving a request at the firmware level anti-malware module to perform the monitoring of firmware accesses.

12. The computing system of claim 8, wherein the anti-malware module comprises a run-time anti-malware module.

13. The computing system of claim 8, wherein the anti-malware operations further comprise performing a malware scan by scanning the firmware.

14. The computing system of claim 13, wherein the anti-malware module further comprises a boot-time anti-malware module configured to perform the malware scan.

15. The computing system of claim 8, wherein perform monitoring of firmware accesses comprises preventing replacement of the run-time anti-malware module and a boot-time anti-malware module.

16. The computing system of claim 8, wherein the anti-malware application is configured to load and configure the run-time anti-malware module through the interface.

17. The computing system of claim 8, wherein the anti-malware application is configured to load and configure a boot-time anti-malware module through the interface, the boot-time anti-malware module configured to perform a malware scan by scanning the firmware for malware.

18. A non-transitory computer storage medium having computer-executable instructions stored thereon which, when executed by a computer system, cause the computer system to:
provide anti-malware support from an anti-malware module stored within a computer system firmware, the anti-malware module comprising a boot-time module and a run-time module, and the anti-malware support comprising
performing a malware scan by scanning the firmware for malware by the anti-malware module,
performing monitoring of firmware accesses during a normal operational mode following a boot-time for malware by the anti-malware module, and
blocking unauthorized modifications to the firmware; and
provide an interface between the anti-malware module stored in the computer system firmware and an anti-malware application executing at an operating system level.

19. The non-transitory computer storage medium of claim 18, having further computer-executable instructions stored thereon which, when executed by the computer system, cause the computer system to provide an interface between the anti-malware module stored in the computer system firmware and an anti-malware application executing at an operating system level.

20. The non-transitory computer storage medium of claim 19, wherein the anti-malware application is configured to load and configure the run-time anti-malware module through the interface between the anti-malware module and the anti-malware application.

\* \* \* \* \*